United States Patent [19]

Sydansk

[11] Patent Number: 4,478,283
[45] Date of Patent: Oct. 23, 1984

[54] PROCESS FOR IMPROVING WATERFLOOD PERFORMANCE IN HETEROGENEOUS CLAY-SENSITIVE FORMATIONS

[75] Inventor: Robert D. Sydansk, Littleton, Colo.

[73] Assignee: Marathon Oil Company, Findlay, Ohio

[21] Appl. No.: 510,126

[22] Filed: Jul. 1, 1983

[51] Int. Cl.$^3$ .......................................... E21B 33/138
[52] U.S. Cl. ...................................... 166/292; 166/273
[58] Field of Search ............... 166/292, 273, 274, 275, 166/305 R

[56] References Cited

U.S. PATENT DOCUMENTS

| | | | |
|---|---|---|---|
| 2,941,597 | 6/1960 | O'Brien | 166/305 R |
| 3,208,528 | 9/1965 | Elliott et al. | 166/273 X |
| 3,371,710 | 3/1968 | Harvey et al. | 166/273 |
| 3,470,956 | 10/1969 | Boston et al. | 166/273 |
| 3,580,337 | 5/1971 | Gogarty et al. | 166/274 X |
| 3,581,824 | 6/1971 | Hurd | 166/273 X |
| 3,637,015 | 1/1972 | Holm | 166/273 |
| 3,677,344 | 7/1972 | Hayes et al. | 166/273 X |
| 3,710,863 | 1/1973 | Webster et al. | 166/274 X |
| 3,827,500 | 8/1974 | Reed | 166/274 X |
| 4,230,183 | 10/1980 | Kalfoglou | 166/274 |

OTHER PUBLICATIONS

Moore, "How to Combat Swelling Clays", *The Petroleum Engineer*, Mar. 1960, pp. 78–100.
Smith et al., "Potassium, Calcium Treatments Inhibit Clay Swelling", *The Oil And Gas Journal*, Nov. 30, 1964, pp. 80–81.
Slobod, "Restoring Permeability to Water-Damaged Clays", *The Oil and Gas Journal*, vol. 68 No. 5, Feb. 2, 1970, pp. 104–108.

Primary Examiner—George A. Suchfield
Attorney, Agent, or Firm—Jack L. Hummel; Rodney F. Brown

[57] ABSTRACT

A freshwater containing polyvalent cations and relatively few or no monovalent cations is injected into a heterogeneous clay-sensitive subterranean hydrocarbon-bearing formation via a well. The polyvalent cation solution displaces the saline connate water in the near wellbore environment and contacts a first water-sensitive clay. The polyvalent cation solution exchanges polyvalent cations for monovalent cations in the first clay causing little clay damage while producing a monovalent cation solution which is thereafter displaced into the far wellbore environment. The monovalent cation solution contacts a second water-sensitive clay in the relatively highly permeable zones of the far well-bore environment to effect clay damage and reduce the permeability of the highly permeable zones in the far wellbore environment. The process results in improved waterflood sweep efficiency.

12 Claims, 1 Drawing Figure

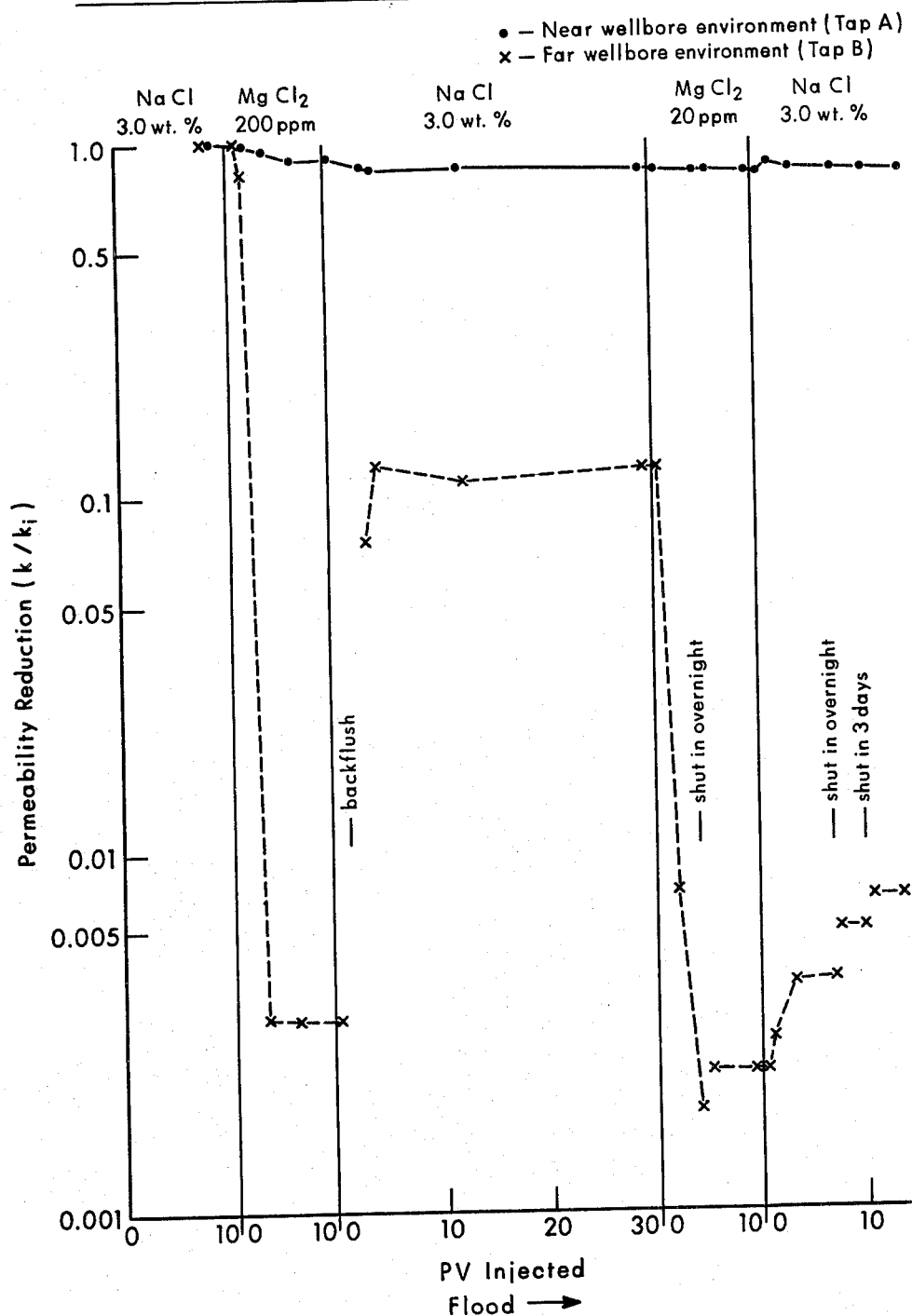

PROCESS FOR IMPROVING WATERFLOOD PERFORMANCE IN HETEROGENEOUS CLAY-SENSITIVE FORMATIONS

DESCRIPTION

1. Technical Field

The invention relates to a process for improving waterflood sweep efficiency in a heterogeneous clay-sensitive subterranean hydrocarbon-bearing formation.

2. Background Art

The juxtaposition of relatively highly permeable geologic zones to relatively less permeable zones within a subterranean formation results in poor waterflood performance. Heterogeneities in a subterranean hydrocarbon-bearing formation generally diminish the sweep efficiency of a waterflood because the flooding water preferentially channels into the zones of relatively high permeability. A significant amount of residual hydrocarbon remains unaffected by the waterflood and is not recovered from the unswept zones of relatively low permeability.

Prior art solutions to the problem of poor waterflood sweep efficiency are aimed at reducing the permeability of the relatively highly permeable zones in the formation. By partially or completely plugging the relatively highly permeable zones, flooding water is diverted from these zones into previously unswept less permeable hydrocarbon-bearing zones, which in turn facilitates the overall recovery of hydrocarbons from the formation. Permeability reduction is accomplished by injecting solutions into the formation which preferentially enter the relatively highly permeable zones. The solutions react in situ to produce permeability reducing compositions, which include high viscosity liquids or solids such as cross-linked polymer gels, resins, and inorganic and organic precipitates. However, the prior art processes for improving waterflood sweep efficiency have been unsatisfactory. They oftentimes reduce the overall permeability of high and low permeability zones alike near the wellbore, which undesirably impedes the ability to inject and produce fluids from the wellbore.

The problem of poor waterflood sweep efficiency is further complicated when flooding a clay-sensitive formation, i.e. a formation containing water-sensitive clay susceptible to damage by a freshwater flood. A clay-sensitive formation is extremely sensitive to the ionic properties of the flooding water. Use of an electrolytically incompatible flooding water can cause the clay to plug the formation blocking movement of injected or produced fluids therein.

A number of prior art processes teach the addition of specific ions to flooding water to improve the compatibility of the flood with the formation. U.S. Pat. No. 3,371,710 to Harvey et al teaches the injection of a polyvalent cation solution into a subterranean formation in conjunction with a nonionic surfactant slug to improve the solubility of the surfactant in the formation environment. U.S. Pat. No. 3,208,528 to Elliot et al teaches the injection of a divalent cation solution into a formation in a stepwise manner. The dissolved solids concentration of the injected solution is reduced in each step until the formation fluids are diluted to the point where a freshwater flood may be undertaken without causing clay damage and corresponding permeability reduction in the formation. U.S. Pat. No. 3,637,015 to Holm teaches the injection of a freshwater containing polyvalent cations and a liquid hydrocarbon surfactant into a near wellbore environment to reduce the oil saturation and improve the injectivity of a subsequent flooding brine. All of these processes are directed to maintaining permeability in the near wellbore environment using ionic solutions. None address the problem of poor waterflood sweep efficiency in clay-sensitive formations.

A process is needed to effectively improve waterflood sweep efficiency in a heterogeneous clay-sensitive subterranean hydrocarbon-bearing formation. More specifically, a process is needed which reduces permeability in the relatively highly permeable zones of the formation, yet does not impede the overall injectivity or productivity of fluids from the wellbore. A simple in situ process is needed which economically and selectively reduces permeability in the formation and may be readily undertaken during waterflooding without interrupting the flood.

DISCLOSURE OF INVENTION

The present invention provides a process for improving waterflood sweep efficiency in a clay-sensitive subterranean hydrocarbon-bearing formation. The process is applicable to formations containing a saline connate water and having either vertical or areal heterogeneity. Such formations characteristically exhibit poor sweep efficiency during waterfloods with brine. This is attributable to the preferential propagation of injected water into the relatively highly permeable zones bypassing the relatively less permeable zones.

The present process reduces the permeability of the relatively highly permeable zones in the far wellbore environment thereby diverting the subsequent waterflood into the relatively less permeable zones and improving the waterflood sweep efficiency. The process effects clay damage in the highly permeable zones of the far wellbore environment to reduce permeability in these zones. However, no significant clay damage nor permeability reduction occurs in the near wellbore environment. As a result, injectivity and productivity of fluids is not diminished at the wellbore.

The process is initiated by injecting a hard freshwater slug containing primarily polyvalent cations into the formation, which displaces the saline connate water from the near wellbore environment. The presence of polyvalent cations in the freshwater slug prevents clay damage in the near wellbore environment thereby maintaining its permeability. The polyvalent cations exchange for monovalent cations present in the formation clay as the slug is displaced away from the wellbore. The slug gradually increases in concentration of monovalent cations while decreasing in concentration of polyvalent cations as it moves through the formation. By the time the slug reaches the far wellbore environment, it contains a relatively high concentration of monovalent cations. The slug preferentially flows through the relatively highly permeable zones of the far wellbore environment where it causes damage to the clay. This clay damage results in permeability reduction to the relatively highly permeable zones. Subsequent floods of ordinary brine are diverted into the previously unswept relatively less permeable zones containing mobile residual hydrocarbon to recover the hydrocarbon therefrom without inducing clay damage.

These results are particularly unexpected because the prior art teaches the use of divalent cation solutions to condition clay-sensitive formations prior to waterflooding to prevent clay damage and permeability reduction. This invention uses a polyvalent cation solution ahead of a waterflood to produce a totally contrary effect; the polyvalent cation induces clay damage and permeability reduction in the far wellbore environment to improve waterflood sweep efficiency.

The effectiveness of the process may be enhanced by first conditioning the formation with a soft water preflush containing a large ratio of monovalent to polyvalent cations. The preflush ensures that monovalent cations are available for exchange with the subsequently injected freshwater slug containing polyvalent cations.

The instant process has particular advantages over the prior art because permeability reduction may be achieved in a cost effective manner during a waterflood without interrupting the flood. If it is discovered during a waterflood that there is poor sweep efficiency, the practitioner can employ the present process as a simple adjunct to the waterflood without interrupting the flood. Practice of the process only requires changing the ionic character of the flooding water. Once the desired level of permeability reduction is achieved by single or multiple applications of the process, injection of the original flooding water can be resumed to complete the waterflood.

BRIEF DESCRIPTION OF THE DRAWINGS

FIG. 1 is a graphical representation of the degree of permeability reduction achieved both in the near and far wellbore environments by flooding a clay-sensitive sandstone plug with polyvalent cation solutions of different concentrations interspersed with brine slugs.

BEST MODE FOR CARRYING OUT THE INVENTION

The present invention relates to a process for improving waterflood sweep efficiencies in subterranean formations. More particularly, the present process improves waterflood sweep efficiencies in heterogeneous clay-sensitive formations by reducing the permeability of relatively highly permeable zones in the far wellbore environment of the formation.

To clarify certain terms as utilized throughout this description, they are defined as follows. "Sweep efficiency" is the fraction of a formation behind the flood front, which has been swept by the flooding fluid. A "zone" is a volume of a formation having substantially continuous geologic properties. "Near wellbore environment" denotes the volume surrounding a wellbore penetrating a subterranean formation wherein fluids exhibit relatively homogeneous flow characteristics. As a general guide, the near wellbore environment usually extends a radial distance into the formation of up to about 3 meters from the wellbore and may extend up to about 9 meters or more. The "far wellbore environment" is the remaining formation volume beyond the near wellbore environment. "Freshwater" has a low total dissolved solids (TDS) concentration. The "hardness" or "softness" of water relates to the polyvalent cation content of the water. "Hard water" contains a significant concentration of polyvalent cations while "soft water" contains a substantially lower concentration. "Hard water" may or may not simultaneously be a "freshwater" depending on the TDS concentration. A "hard freshwater" contains a significant concentration of polyvalent cations yet has a lower TDS concentration relative to a non-freshwater such as a saline connate water.

The present process is particularly effective for improving poor waterflood sweep efficiencies in clay-sensitive formations, which exhibit either vertical or areal heterogeneity and contain zones of relatively high and low permeability. In general, such formations contain saline connate water with a TDS concentration of above 1000 ppm and a large ratio of monovalent to polyvalent cations, at least 5 to 1. Typical monovalent cations naturally present in connate water are $Na^+$, $H^+$, $K^+$, $Ce^+$, $Li^+$, etc.

Permeability reduction in relatively highly permeable zones of the far wellbore environment is achieved by injecting a polyvalent cation solution, which is a hard freshwater, into the formation. The polyvalent cation solution may contain any positively charged, water soluble, polyvalent cation. This includes divalent cations and trivalent cations. Divalent cations, such as $Mg^{++}$, $Fe^{++}$, $Ca^{++}$, $Sr^{++}$, $Ba^{++}$, etc., are preferred polyvalent cations. Trivalent cations, such as $Al^{+++}$ and $Cr^{+++}$, are less preferred because they present additional difficulties due to their chemical instability. $Mg^{++}$ is the most preferred polyvalent cation because of its low cost, relative chemical inertness, high ionic charge, low molecular weight and other reasons which will become apparent.

The concentration range of polyvalent cation in the aqueous solution is from about 5 ppm to about 100,000 ppm and preferably about 20 ppm to about 10,000 ppm. The cation is preferably dissolved as a salt, such as $MgCl_2$, $CaCl_2$ or the like, in a freshwater. A small amount of monovalent cation may be present in the polyvalent cation solution so long as the relative ratio of polyvalent to monovalent cations is large, i.e. at least 5 to 1. The polyvalent cation solution is less saline than the connate water, i.e. the TDS concentration of the polyvalent cation solution is less than that of the saline connate water.

The polyvalent cation solution can be injected as a single slug into the formation. The slug size should not exceed one pore volume of the formation. In practice the slug size will usually be much smaller than one pore volume of the formation. Functionally the slug must be large enough to substantially reduce permeability in the relatively highly permeable zones of the far wellbore environment of the formation. Therefore the amount of slug required is dependent on the particular geological characteristics of the formation. The skilled artisan can readily determine the specific amount of fluid required to be injected to achieve the desired result.

The polyvalent cation solution can also be injected sequentially in multiple slugs interspersed with a waterflooding brine in a stepwise fashion. Staged permeability reduction in the formation can be achieved in this manner.

The effectiveness of the polyvalent cation slug can be enhanced by the pretreatment of the formation with a monovalent cation solution. Any water soluble monovalent cation is satisfactory as a pretreating agent, such as $Na^+$, $H^+$, $K^+$, $NH_4^+$, etc. The pretreatment solution, containing from about 0.1% by weight to about 10% by weight monovalent cations, is injected into the formation ahead of the polyvalent cation slug. The polyvalent cation slug is then injected in the manner described above.

It is believed that the process is initiated by an ionic exchange between the polyvalent cation slug and the clay as the slug is propagated away from the wellbore. Prior to injection of the polyvalent cation, a saline connate water containing a large ratio of monovalent to divalent cations is typically present in the formation pores. An ionic equilibrium exits between the clay and the saline connate water. The clay has a layered planar structure and is negatively charged at the plane faces. At equilibrium, the charge is neutralized by positive cations in the saline connate water.

When a freshwater slug containing polyvalent cations and few or no monovalent cations is injected into the formation, the injected slug displaces the saline connate water in the near wellbore environment. The ionic equilibrium in the pores is upset by the change in relative cation concentration. Polyvalent cations are preferred to monovalent cations by the clay due to their higher charge density. Therefore, the polyvalent cations in the freshwater slug exchange with the monovalent cations in the clay with no resulting clay damage from the freshwater slug in the near wellbore environment.

As the freshwater slug is displaced through the formation clay into the far wellbore pores, the slug gradually decreases in polyvalent cation concentration and increases in monovalent cation concentration without a significant change in overall TDS concentration. The ionic balance in the slug eventually shifts in favor of monovalent cations. The slug is characterized as a monovalent cation solution because it has a substantially higher concentration of monovalent cations than the polyvalent cation solution, although the monovalent cation solution may retain a high polyvalent cation concentration as well. The monovalent cation solution is also a freshwater slug because it remains low in TDS concentration.

The formation clays are susceptible to damage due to swelling and migration caused by the presence of the monovalent cation solution. When clay damage occurs, the pore throats become blocked by the damaged clay particles impeding fluid flow through the pores. In this manner, it is believed that permeability is reduced in the relatively highly permeable zones of the far wellbore environment.

Applications of the instant process are illustrated by the following examples. However the examples are not to be construed as limiting the scope of the invention.

EXAMPLE 1

Two pressure sensing taps are placed over the length of a clay-sensitive unfired Berea Sandstone plug. The plug is 2.5 cm in diameter and 5.8 cm long with an initial permeability of 240 md. Tap A, which represents the near wellbore environment is placed over the first 1.91 cm of the plug from the injection face. Tap B, which represents the far wellbore environment, is placed over the remaining 3.94 cm of the plug. The plug is first flooded with 10 pore volumes (PV) of a waterflooding brine, synthetic Oligocene-age-reservoir produced water. The plug is then flooded with 40 PV of a hard freshwater slug. The freshwater slug is produced by dissolving magnesium chloride (MgCl₂) in distilled water to obtain a 5.0 ppm MgCl₂ solution containing substantially no monovalent cations. The plug is then flooded with an additional 20 PV of the reservoir brine. The fluids are injected into the plug at a rate of 21 meters per day. Permeability reduction $(k/k_i)$ is measured over Taps A and B as a function of the type and amount of fluid injected. $(k/k_i)_A$ is permeability reduction in the near wellbore environment and $(k/k_i)_B$ is permeability reduction in the far wellbore environment. PV represents the amount of fluid injected in pore volumes for that particular sequence of injections. The results are listed in Table 1 below.

TABLE 1

| Injected Fluid | PV | $(k/k_i)_A$ | $(k/k_i)_B$ |
| --- | --- | --- | --- |
| Brine | 0 | 1.0 | 1.0 |
| Brine | 10 | 1.0 | 1.0 |
| MgCl₂ | 1 | 0.84 | 1.0 |
| MgCl₂ | 2 | 0.82 | 0.84 |
| MgCl₂ | 5 | 0.84 | 0.47 |
| MgCl₂ | 10 | 0.84 | 0.33 |
| MgCl₂ | 20 | 0.84 | 0.23 |
| MgCl₂ | 30 | 0.80 | 0.21 |
| MgCl₂ | 40 | 0.79 | 0.19 |
| Brine | 1 | 0.90 | 0.22 |
| Brine | 5 | 0.90 | 0.22 |
| Brine | 10 | 0.84 | 0.22 |
| Brine | 20 | 0.84 | 0.22 |

EXAMPLE 2

An unfired Berea plug with an initial permeability of 340 md has dimensions of 2.5 cm in diameter and 6.2 cm long. Tap A is placed over the first 1.71 cm of the plug from the injection face. Tap B is placed over the remaining 4.45 cm of the plug. The plug is flooded with a brine containing 3 wt % NaCl. The plug is then flooded with 30 PV of a freshwater slug containing 20 ppm MgCl₂ and substantially no monovalent cations. Finally the plug is flooded with another 32 PV of the NaCl brine. Fluids are injected at variable rates. Permeability reduction is recorded in Table 2 below.

TABLE 2

| Injected Fluid | PV | $(k/k_i)_A$ | $(k/k_i)_B$ |
| --- | --- | --- | --- |
| MgCl₂ | 0 | 1.0 | 1.0 |
| MgCl₂ | 1 | 0.58 | 1.0 |
| MgCl₂ | 4 | 0.54 | 0.27 |
| MgCl₂ | 8 | 0.43 | 0.14 |
| MgCl₂ | 12 | 0.41 | 0.080 |
| MgCl₂ | 16 | 0.44 | 0.042 |
| MgCl₂ | 20 | 0.40 | 0.030 |
| MgCl₂ | 30 | 0.39 | 0.024 |
| NaCl | 1 | 0.45 | 0.036 |
| NaCl | 4 | 0.43 | 0.038 |
| NaCl | 8 | 0.42 | 0.038 |
| NaCl | 16 | 0.42 | 0.040 |
| Shut In 3 Days | | | |
| NaCl | 18 | 0.42 | 0.12 |
| NaCl | 32 | 0.42 | 0.11 |

EXAMPLE 3

An unfired Berea plug with an initial permeability of 790 md has dimensions of 2.5 cm in diameter by 7.7 cm long. Tap A is placed over the first 0.73 cm of the plug from the injection face. Tap B is placed over the remaining 6.99 cm of the plug. The plug is first flooded with 10 PV of the NaCl brine of Example 2. The plug is then flooded with 10 PV of a hard water containing 200 ppm MgCl₂ and substantially no monovalent cations. The plug is backflushed and flooding is resumed with 30 PV of the NaCl brine. The plug is flooded with 4 PV of a freshwater containing 20 ppm MgCl₂ and shut-in overnight. The plug is flooded with an additional 6 PV of the freshwater containing 20 ppm MgCl₂. The plug is then flooded with 7 PV of the NaCl brine and shut-in overnight. Permeability reduction is measured after shut-in and the plug is flooded with 3 more PV of NaCl brine before being shut-in for three more days. Permeability reduction is measured after shut-in and finally the plug is flooded with 2 more PV of NaCl brine. Fluids are injected at variable rates. Permeability reduction is recorded in Table 3 below and graphically in FIG. 1.

TABLE 3

| Injected Fluid | PV | $(k/k_i)_A$ | $(k/k_i)_B$ |
|---|---|---|---|
| NaCl | 7.5 | 1.0 | 1.0 |
| NaCl | 10 | 1.0 | 1.0 |
| MgCl$_2$ (200 ppm) | 1 | 0.98 | 0.80 |
| MgCl$_2$ (200 ppm) | 3 | 0.95 | 0.0035 |
| MgCl$_2$ (200 ppm) | 6 | 0.90 | 0.0034 |
| MgCl$_2$ (200 ppm) | 10 | 0.90 | 0.0033 |
| Backflush | | | |
| NaCl | 3 | 0.86 | 0.075 |
| NaCl | 4 | 0.84 | 0.12 |
| NaCl | 12 | 0.84 | 0.11 |
| NaCl | 29 | 0.82 | 0.12 |
| NaCl | 30 | 0.82 | 0.12 |
| MgCl$_2$ (20 ppm) | 2 | 0.81 | 0.0078 |
| MgCl$_2$ (20 ppm) | 4 | 0.80 | 0.0019 |
| Shut-In Overnight | | | |
| MgCl$_2$ (20 ppm) | 5 | 0.80 | 0.0024 |
| MgCl$_2$ (20 ppm) | 10 | 0.80 | 0.0024 |
| NaCl | 1 | 0.84 | 0.0030 |
| NaCl | 3 | 0.81 | 0.0042 |
| NaCl | 7 | 0.80 | 0.0043 |
| Shut-In Overnight | | | |
| NaCl | 7 | 0.80 | 0.0060 |
| NaCl | 10 | 0.80 | 0.0060 |
| Shut-In Three Days | | | |
| NaCl | 10 | 0.80 | 0.0074 |
| NaCl | 12 | 0.80 | 0.0074 |

Example 1 clearly shows that the permeability over downstream Tap B was preferentially reduced even at a low divalent cation concentration. This permeability reduction was retained during continued waterflooding. The small amount of permeability reduction over Tap A may occur because Tap A extends so far from the injection face that it detects some far wellborne permeability damage. Example 2 shows even greater permeability reduction than Example 1 using a 3% NaCl preflush and an increased divalent cation concentration. Some of the permeability damage over Tap B is negated during the post waterflooding by shutting-in the flood for three days. This behavior is typical of clay-particle-migration permeability damage.

Example 3 highlights the unexpected results of the instant invention. In Example 3, Tap A does not extend as far from the injection face as Examples 1 and 2. Very large permeability reductions, over 2 orders of magnitude, are observed over Tap B in the far wellbore environment. Little permeability reduction, about 10 percent, is observed over Tap A in the near wellbore environment. Less permeability reduction occurs over Tap A in this example than in Examples 1 and 2. Apparently Tap A does not detect permeability damage in the far wellbore environment because it has been moved closer to the injection face. The decrease in permeability reduction over Tap B, which occurs after backflushing, is also behavior typical of clay-particle-migration permeability damage.

While the foregoing preferred embodiment of the invention has been described and shown, it is understood that the alternatives and modifications, such as those suggested, and others may be made thereto, and fall within the scope of the invention.

What is claimed is:

1. A process for reducing the permeability of at least one relatively highly permeable zone in a far wellbore environment of a clay-sensitive subterranean formation penetrated by a wellbore in fluid communication therewith, said formation containing a saline connate water and having said at least one relatively highly permeable zone and at least one relatively less permeable zone, the process comprising the steps of:
   (a) injecting a polyvalent cation solution less saline than said connate water via said wellbore into a near wellbore environment of said formation containing a first water-sensitive clay;
   (b) contacting said first clay with said polyvalent cation solution in said near wellbore environment of said formation for a time sufficient to transform said polyvalent cation solution into a monovalent cation solution;
   (c) displacing said monovalent cation solution from said near wellbore environment into said at least one relatively highly permeable zone of said far wellbore environment; and
   (d) contacting a second water-sensitive clay with said monovalent cation solution in said at least one relatively highly permeable zone of said far wellbore environment to reduce the permeability of said at least one relatively highly permeable zone.

2. The process of claim 1 wherein said formation is preflushed with an aqueous solution having a large ratio of monovalent to polyvalent cations prior to injecting said polyvalent cation solution.

3. The process of claim 1 wherein said polyvalent cation is a divalent cation.

4. The process of claim 3 wherein said divalent cation is selected from the group consisting of $Mg^{++}$, $Ca^{++}$, $Fe^{++}$, $Sr^{++}$ and $Ba^{++}$.

5. The process of claim 4 wherein said divalent cation is $Mg^{++}$.

6. The process of claim 1 wherein the concentration of said polyvalent cations in said polyvalent cation solution is about 5 ppm to about 100,000 ppm.

7. The process of claim 6 wherein the concentration of said polyvalent cations in said polyvalent cation solution is about 20 ppm to about 10,000 ppm.

8. The process of claim 1 wherein said polyvalent cation solution contains substantially no monovalent cations.

9. The process of claim 6 wherein said polyvalent cation solution contains monovalent cations in a ratio of at least about 5:1, polyvalent cations to monovalent cations.

10. The process of claim 1 wherein said connate water has a total dissolved solids concentration above 1000 ppm and a monovalent to divalent cation ratio of at least about 5:1.

11. The process of claim 10 wherein the total dissolved solids concentration of said polyvalent cation solution is less than the total dissolved solids concentration of said connate water.

12. The process of claim 1 wherein said subterranean formation is a hydrocarbon-bearing formation.

* * * * *

UNITED STATES PATENT AND TRADEMARK OFFICE
CERTIFICATE OF CORRECTION

PATENT NO. : 4,478,283
DATED : October 23, 1984
INVENTOR(S) : Robert D. Sydansk

It is certified that error appears in the above-identified patent and that said Letters Patent are hereby corrected as shown below:

Abstract, line 15:  Delete "well-bore" and insert --wellbore--.
Col. 5, line 3:     Delete "exits" and insert --exists--.
Col. 1, line 59:    Delete "Elliot" and insert --Elliott--.

Signed and Sealed this

Eighteenth Day of June 1985

[SEAL]

Attest:

DONALD J. QUIGG

Attesting Officer      Acting Commissioner of Patents and Trademarks